United States Patent
Shimizu (10) Patent No.: US 6,959,746 B2
(45) Date of Patent: Nov. 1, 2005

(54) PNEUMATIC TIRE (75) Inventor: Akiyoshi Shimizu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 154 days.

(21) Appl. No.: 10/276,248

(22) PCT Filed: Mar. 15, 2002

(86) PCT No.: PCT/JP02/02512

§ 371 (c)(1),
(2), (4) Date: Nov. 14, 2002

(87) PCT Pub. No.: WO02/074560

PCT Pub. Date: Sep. 26, 2002

(65) Prior Publication Data

US 2004/0026000 A1 Feb. 12, 2004

(30) Foreign Application Priority Data

Mar. 16, 2001 (JP) .......................................... 2001-75411

(51) Int. Cl.[7] .............................. B60C 9/18; B60C 9/20
(52) U.S. Cl. ........................ 152/534; 152/526; 152/535
(58) Field of Search ................................. 152/526–527, 152/531–532, 534–535, 538, 548, 450–451

(56) References Cited

U.S. PATENT DOCUMENTS

| | | | | |
|---|---|---|---|---|
| 3,217,778 A | * | 11/1965 | Kovac et al. ............... | 152/556 |
| 4,129,162 A | * | 12/1978 | DeWitt ........................ | 152/527 |
| 4,172,487 A | * | 10/1979 | Suzuki et al. ............... | 152/527 |
| 4,696,335 A | * | 9/1987 | Tsukagoshi et al. ........ | 152/535 |
| 5,004,031 A | * | 4/1991 | Kadota et al. .............. | 152/538 |
| 5,054,532 A | * | 10/1991 | Kohno et al. ............... | 152/527 |
| 5,109,906 A | * | 5/1992 | Giancola ..................... | 152/536 |
| 5,271,445 A | * | 12/1993 | Kohno et al. ............... | 152/527 |
| 5,383,507 A | * | 1/1995 | Sato et al. ................... | 152/527 |
| 5,591,284 A | * | 1/1997 | Gaudin ........................ | 152/532 |
| 5,695,578 A | * | 12/1997 | Boiocchi et al. ............ | 152/458 |
| 5,711,829 A | * | 1/1998 | Pollard et al. .............. | 152/451 |
| 5,858,137 A | * | 1/1999 | Assaad et al. .............. | 152/527 |
| 6,470,939 B1 | * | 10/2002 | Cluzel ......................... | 152/532 |
| 6,612,353 B2 | * | 9/2003 | Cluzel ......................... | 152/526 |
| 6,668,890 B1 | * | 12/2003 | Kadota ........................ | 152/534 |
| 6,708,747 B1 | * | 3/2004 | Tsuruta et al. .............. | 152/526 |

FOREIGN PATENT DOCUMENTS

| | | |
|---|---|---|
| EP | 98 0770 A2 | 2/2000 |
| JP | 6-191210 A | 7/1994 |
| JP | 6-191212 A | 7/1994 |
| JP | 2000-6613 A | 1/2000 |
| JP | 2000-203215 A | 7/2000 |
| JP | 2001-121916 A | 5/2001 |
| JP | 2001-213115 A | 8/2001 |

* cited by examiner

Primary Examiner—Russell D. Stormer
Assistant Examiner—Jason R. Bellinger
(74) Attorney, Agent, or Firm—Sughrue Mion, PLLC (57) ABSTRACT

A pneumatic tire including a carcass, a belt arranged at the outside of the carcass in a radial direction and having at least two belt layers, at least one belt reinforcing layer arranged so as to overlap with the belt and extend over a widthwise outer end thereof, and a tread rubber arranged at the outside of the belt in the radial direction. A pair of split auxiliary belt layers are arranged so as to overlap at least with both widthwise outer end portions of a widest-width belt reinforcing layer. Reinforcing elements having an inclination angle different from that of reinforcing elements in the belt reinforcing layer are embedded in the split auxiliary belt layer for decreasing the wearing rate at the tread end portion of the tire to effectively control irregular wear.

8 Claims, 10 Drawing Sheets

PNEUMATIC TIRE

TECHNICAL FIELD

This invention relates to a pneumatic tire capable of controlling rapid wearing at an end portion of a tread.

BACKGROUND ART

In general, the pneumatic tire comprises a belt comprised of at least two cross belt layers, reinforcing elements embedded in which layers being crossed with each other with respect to an equatorial plane of the tire. In JP-A-2000-203215 is disclosed a pneumatic tire wherein at least one belt reinforcing layer having a width wider than that of the belt layer, in which plural reinforcing elements are embedded therein so as to extend in a circumferential direction while bending in wavy or zigzag form, is further provided for controlling separation failure at a widthwise outer end portion of the belt layer to improve a belt durability.

However, an outer surface of a tread portion in the pneumatic tire including the tire disclosed in the above publication is generally constructed with an arc having a single radius of curvature or a plurality of arcs having different radii of curvature for properly holding a ground contacting shape or a ground contact pressure, and shaped into a convex form increasing a radius (distance from a rotating axis) from both tread ends toward the equatorial plane of the tire.

When the outer surface of the tread portion is shaped into the convex form as mentioned above, there is a problem that irregular wear is caused because a force directing forward in a traveling direction (driving side) in the vicinity of the equatorial plane of the tire and a force directing backward in the traveling direction (braking side) in the vicinity of the tread end are applied to the outer surface of the rotating tread portion in accordance with a size difference (difference in peripheral length) to increase a wearing rate at the tread end portion. Such a problem or wearing at the tread end portion becomes more remarkable when the pneumatic tire is particularly mounted onto a driving wheel of a vehicle because the backward force becomes larger.

Figure 10:
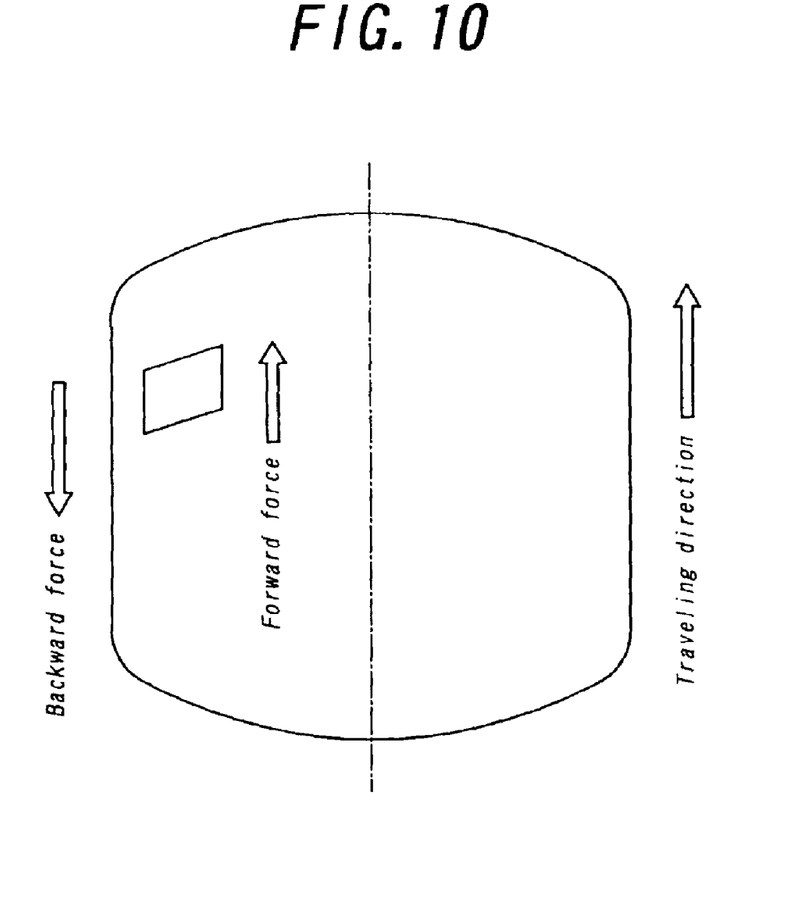
FIG. 10 is a schematic view illustrating a deformation state of a tread portion at a ground contact face.

Now, the inventor has made various studies with respect to a wear generating mechanism in the tread end portion of the pneumatic tire disclosed in the above publication and obtained the following knowledge. That is, as shown in FIG. 10, when the force directing forward in the traveling direction is applied to the vicinity of the equatorial plane of the tire and the force directing backward in the traveling direction is applied to the vicinity of the tread end during the rotation of the tire, the tread portion is subjected to shearing deformation. Even when widthwise outer end portions of one or more of widest-width belt reinforcing layers are existent outside a widthwise outer end of a wider-width belt layer in the widthwise direction, since the embedded reinforcing elements extend substantially in the circumferential direction and shearing rigidity in the circumferential direction at the outer end portion of the belt reinforcing layer is small, the shearing deformation becomes violently large at the tread end portion corresponding to the above outer end portion and hence a large slippage to a road surface is always generated and the wearing rate at the tread end portion becomes large.

DISCLOSURE OF THE INVENTION

The invention is based on the above knowledge and is to decrease the wearing rate at the tread end portion to effectively control irregular wear in the pneumatic tire provided with the widest-width belt reinforcing layer.

In order to achieve the above object, the invention lies in a pneumatic tire comprising a carcass toroidally extending between a pair of bead portions, a belt arranged at the outside of the carcass in a radial direction and comprised of at least two belt layers, plural reinforcing elements embedded in which layers being crossed with each other with respect to an equatorial plane of the tire, at least one belt reinforcing layer arranged so as to overlap with the belt and extend over a widthwise outer end thereof and embedding plural reinforcing elements therein each extending substantially in a circumferential direction while bending in a wavy or zigzag form, and a tread rubber arranged at the outside of the belt in the radial direction, characterized in that a pair of split auxiliary belt layers are arranged so as to overlap at least with both widthwise outer end portions of a widest-width belt reinforcing layer and comprised of at least one ply containing plural reinforcing elements embedded therein at an inclination angle with respect to the equatorial plane different from that of the reinforcing element in the widest-width belt reinforcing layer.

Since both widthwise outer end portions of the widest-width belt reinforcing layer do not overlap with the belt, the shearing rigidity in the circumferential direction is small as previously mentioned. In the invention, however, the split auxiliary belt layer is arranged so as to overlap with the above end portion and the inclination angle of the reinforcing element embedded in the split auxiliary belt layer with respect to the equatorial plane S is different from that of the reinforcing element in the belt reinforcing layer, so that the reinforcing elements in both the layers are crossed with each other to strengthen the widthwise outer end portion of the widest-width belt reinforcing layer and hence the shearing rigidity in the circumferential direction at the tread end portion becomes large.

As a result, even when the force directing forward in the traveling direction is applied to the vicinity of the equatorial plane of the tire and the force directing backward in the traveling direction is applied to the vicinity of the tread end during the rotation of the pneumatic tire, the shearing deformation at the tread end portion is effectively controlled, whereby the slippage between the tread end portion and the road surface can be reduced to decrease the wearing rate at the tread end portion to thereby effectively control the occurrence of irregular wear.

In a preferable embodiment of the invention, when the split auxiliary belt layer overlaps with only the widest-width belt reinforcing layer and an axial distance from the equatorial plane of the tire to the tread end (tread half-width) is W, a width H of the split auxiliary belt layer is within a range of 0.10W–0.60W and a distance M from the equatorial plane of the tire to a widthwise outer end of the split auxiliary belt layer is within a range of 0.90W–1.20W. According to this construction, the wearing rate at the tread end portion can be strongly decreased while controlling the occurrence of separation failure.

In another preferable embodiment of the invention, the split auxiliary belt layer is arranged between the carcass and the widest-width belt reinforcing layer. According to this construction, the shearing deformation of the carcass can also be surely controlled.

In the other preferable embodiment of the invention, the split auxiliary belt layer is arranged between the tread rubber and the widest-width belt reinforcing layer. According to this construction, the propagation of the shearing deformation at the tread end portion can be shut off on the way and hence the total amount of the shearing deformation is decreased.

In a further preferable embodiment of the invention, the inclination angle of the reinforcing element embedded in the split auxiliary belt layer with respect to the equatorial plane of the tire is within a range of 10°–80°. According to this construction, the shearing deformation at the tread end portion can be strongly controlled while facilitating the shaping of the split auxiliary belt layer.

In a still further preferable embodiment of the invention, the widthwise inner end portion of the split auxiliary belt layer is particularly arranged over the widest-width belt reinforcing layer so as to overlap with the widthwise outer end portion of a wider-width belt layer among the belt layers constituting the belt in the radial direction, and the reinforcing elements in the split auxiliary belt layer are inclined in the same direction as the reinforcing elements inclined in the wider-width belt layer. According to this construction, a part of the split auxiliary belt layer is always existent outward from the belt layer and the belt reinforcing layer in the widthwise direction, and also the reinforcing elements embedded in the split auxiliary belt layer are inclined in the same direction as the reinforcing elements in the wider-width belt layer, so that the shearing rigidity of the split auxiliary belt layer in the circumferential direction has a value larger than that of the belt reinforcing layer. As a result, the shearing deformation of the tread rubber in the vicinity of the tread end based on the difference in the peripheral length is controlled by the split auxiliary belt layer and the force directing toward the braking side in the vicinity of the tread end resulted from such a shearing deformation is reduced, whereby the irregular wear can be effectively controlled.

And also, the widthwise outer end of the split auxiliary belt layer is located outward from the widthwise outer ends of the belt layer and the belt reinforcing layer in the widthwise direction, so that strain is considered to concentrate in the widthwise outer end of the split auxiliary belt layer during the running of the tire under loading. However, the width of the split auxiliary belt layer is narrower than that of the wider-width belt layer and the widthwise inner end portion thereof overlaps with the widthwise outer end portion of the belt layer, so that the split auxiliary belt layer can freely deform as compared with the belt layer while subjecting to a restraint by the belt layer to a certain extent. As a result, strain produced at the widthwise outer end of the split auxiliary belt layer never takes a large value, and the occurrence of belt end separation at the outer end is controlled. In this case, if the reinforcing elements in the split auxiliary belt layer are inclined in a direction opposite to the reinforcing elements in the belt layer, there is a fear of generating interlaminar separation because the rigidity of the overlapped portion becomes high. In the invention, however, the fear of increasing the rigidity is prevented by inclination in the same direction.

In another preferable embodiment of the invention, the reinforcing elements in the split auxiliary belt layer are parallel to the reinforcing elements in the wider-width belt layer or are inclined in the same direction within a range of +10° to −10°. In this case, the separation failure between the split auxiliary belt layer and the wider-width belt layer can be effectively controlled.

In the other preferable embodiment of the invention, a width O of an overlapped portion between the split auxiliary belt layer and the wider-width belt layer is within a range of 0.03–0.10 times a tread width 2W (W is an axial distance from the equatorial plane of the tire to the tread end). In this case, the shearing deformation of the tread rubber in the vicinity of the tread end can be effectively controlled while effectively controlling the separation failure between the split auxiliary belt layer and the wider-width belt layer.

In a further preferable embodiment of the invention, a width B of the wider-width belt layer is within a range of 0.40–0.85 times the tread width 2W. In this case, the concentration of strain in the widthwise outer ends of the split auxiliary belt layer and the wider-width belt layer can be effectively controlled.

BEST MODE FOR CARRYING OUT THE INVENTION

An embodiment of the invention will be described with reference to the accompanying drawings below.

Figure 1:
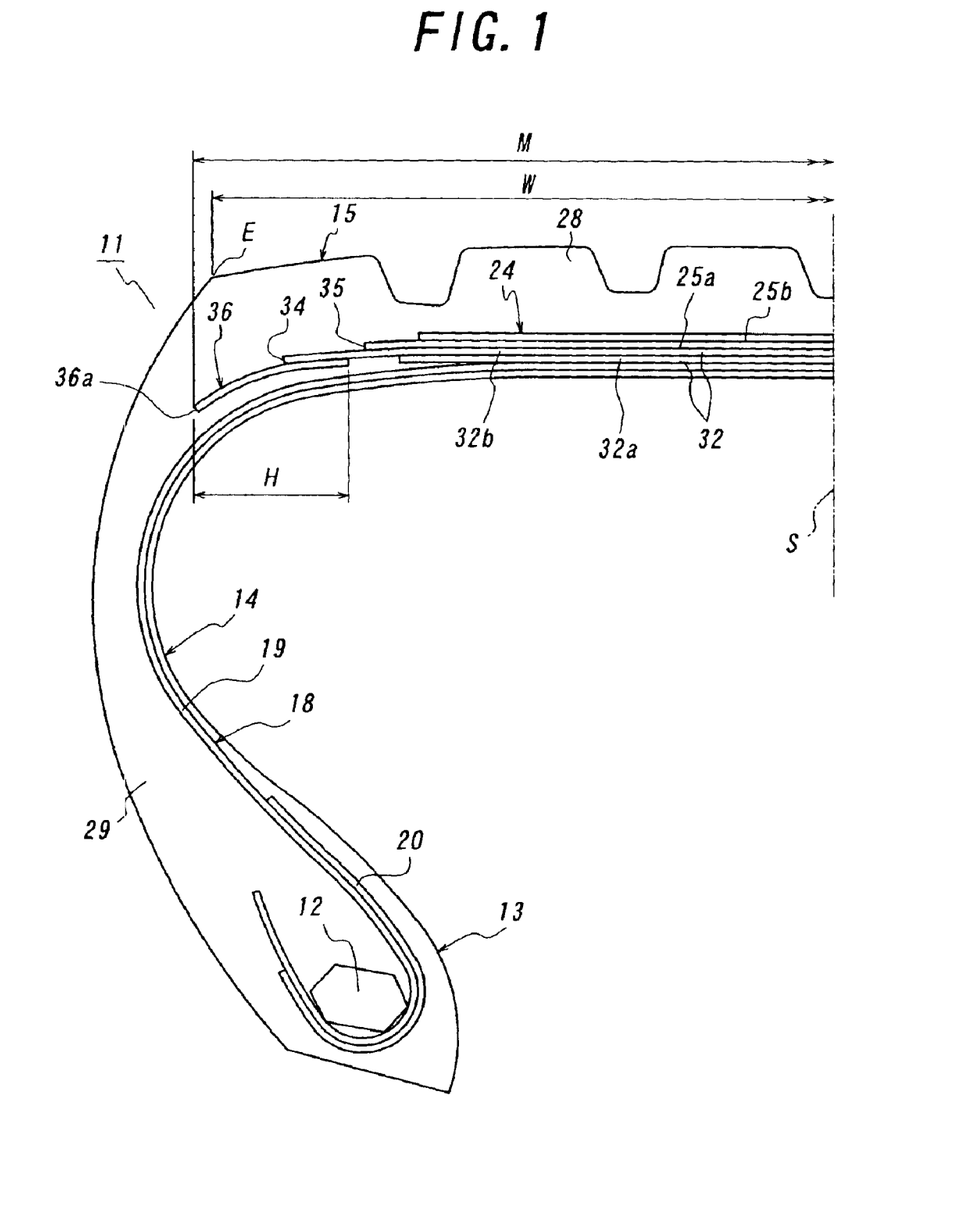
FIG. 1 is a diagrammatically radial section view of an embodiment of the tire according to the invention.
Figure 2:
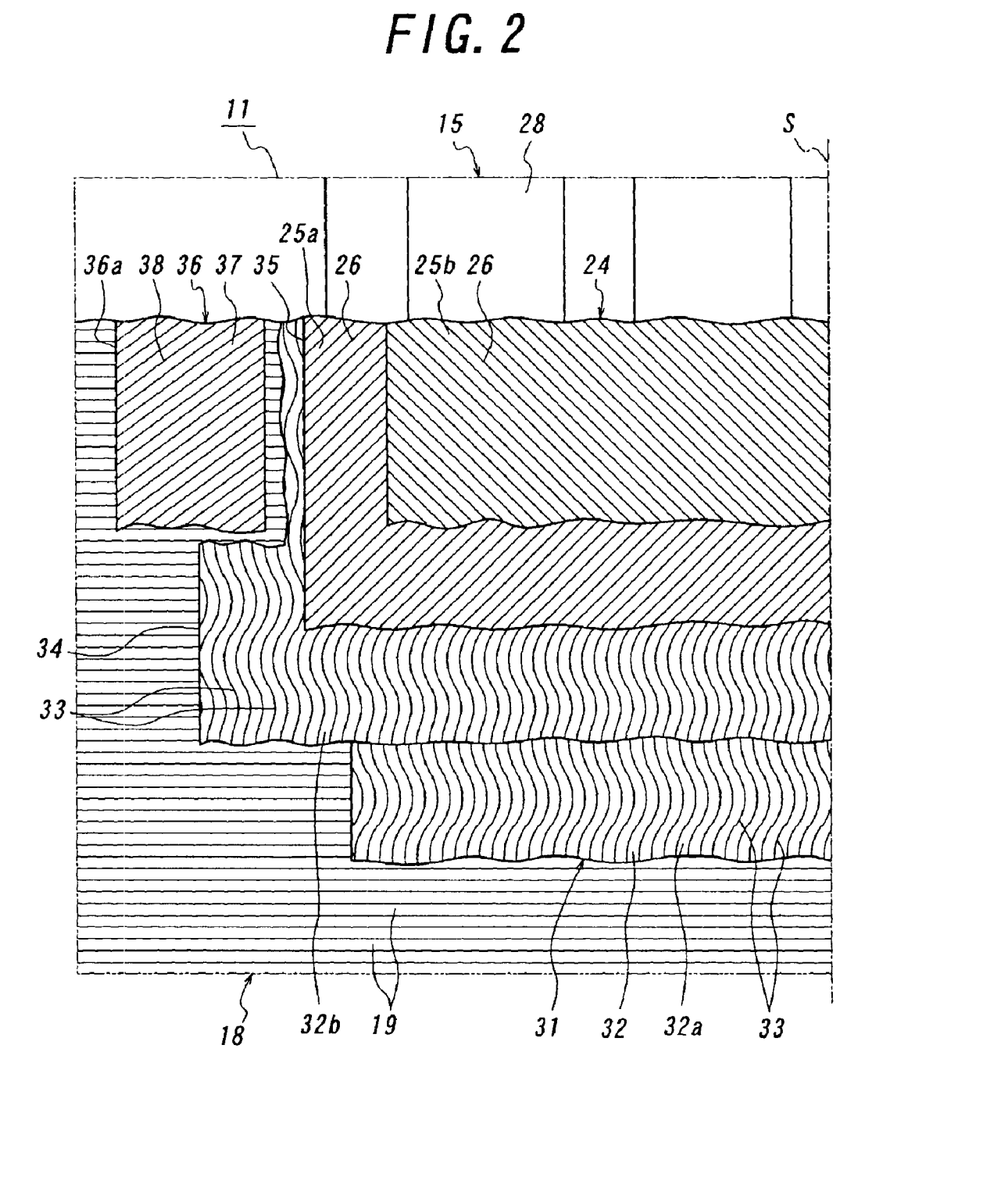
FIG. 2 is a partly broken plan view of a tread portion in the tire shown in FIG. 1.

In FIGS. 1 and 2, numeral 11 is a heavy duty pneumatic radial tire mounted onto a truck, bus or the like and having an aspect ratio of not more than 0.70. The tire 11 comprises a pair of bead portions 13 each embedding a bead core 12 therein, sidewall portions 14 extending substantially outward from these bead portions 13 in a radial direction, and a tread portion 15 of substantially a cylindrical form connecting to radially outer ends of these sidewall portions 14.

Also, the tire 11 comprises a carcass 18 toroidally extending between the pair of bead cores 12 to reinforce the sidewall portions 14 and the tread portion 15, in which both end portions of the carcass 18 are turned up around the respective bead cores 12 from an axially inside toward an axially outside. The carcass 18 is comprised of at least one carcass ply, one ply in the illustrated embodiment, in which many inextensible reinforcing elements such as steel cords extending in the radial direction (meridional direction) are embedded in the carcass ply. And also, a chafer 20 reinforced with, for example, steel cords is arranged around the carcass 18 in the bead portion 13.

Furthermore, the tire 11 comprises a belt 24 comprised of at least two belt layers 25 (two layers in the illustrated embodiment) arranged at the outside of the carcass 18 in the radial direction. In the interior of each belt layer 25 are embedded many inextensible reinforcing elements 26 made of, for example, steel, aramid fiber or the like. The reinforcing elements 26 embedded in these belt layers 25 are inclined at an angle of 10°–60°, preferably 40°–60° with respect to an equatorial plane S of the tire, in which the inclination directions in the at least two belt layers 25 are opposite to each other with respect to the equatorial plane S. Moreover, an inner belt layer 25a located inward in the radial direction is wider in the width than an outer belt layer 25b located outward in the radial direction.

In FIG. 1, numeral 28 is a tread rubber arranged at the outside of the belt 24 in the radial direction, and numeral 29 a side rubber arranged at the outside of the carcass 18 in the axial direction.

The tire 11 having the above structure further comprises at least one belt reinforcing layer 32, two layers in the illustrated embodiment arranged at the radially inside of the belt 24 and at the radially outside of the carcass 18, i.e. between the belt 24 and the carcass 18 so as to overlap with the belt 24. In the interior of each belt reinforcing layer 32 are embedded reinforcing elements 33 extending substantially in the circumferential direction and made of an inextensible material such as steel, aramid fiber or the like, in which many reinforcing elements 33 each made of a cord (twisting wires) or a monofilament are developed in the radial section of each belt reinforcing layer 32. And also, these reinforcing elements 33 are bent in a wavy or zigzag form such as a square wave, a triangular wave or a sine wave in a plane parallel to front and back surfaces of each belt reinforcing layer 32 and arranged at the same pitch phase.

Each of the belt reinforcing layers 32 is formed by helically winding a ribbon-shaped body, in which a small number of the reinforcing elements 33 are arranged side by side and coated with rubber, on an outside of the carcass 18 many times. Here, an outer belt reinforcing layer 32b located outward in the radial direction is wider in the width than an inner belt reinforcing layer 32a located inward in the radial direction and the aforementioned inner belt layer 25a. As a result, the outer belt reinforcing layer 32b is a widest-width layer among the belt layers 25 and the belt reinforcing layers 32. Also, the inner belt layer 25a is wider in the width than the inner belt reinforcing layer 32a, so that the inner belt layer 25a is a wider-width layer among the belt layers 25 and the belt reinforcing layers 32.

As a result, the widthwise outer end 34 of the widest-width outer belt reinforcing layer 32b is located outward from the widthwise outer end 35 of the wider-width inner belt layer 25a in the widthwise direction. That is, the widthwise outer end portion of the outer belt reinforcing layer 32b located outward from the widthwise outer end 35 of the inner belt layer 25a in the widthwise direction is only one layer, and the reinforcing elements 33 in the outer belt reinforcing layer 32b extend substantially in the circumferential direction to hardly withstand to shearing force in the circumferential direction, so that the shearing rigidity in the circumferential direction at both widthwise outer end portions of the outer belt reinforcing layer 32b, i.e. at the tread end portion is a very small value.

In the invention, however, a pair of split auxiliary belt layers 36 made of at least one ply (one ply in the illustrated embodiment) are arranged so as to overlap with both widthwise outer end portions of the outer belt reinforcing layer 32b, and the reinforcing elements 38 having an inclination angle with respect to the equatorial plane S of the tire different from that of the reinforcing element 33 in the widest-width outer belt reinforcing layer 32b are embedded in each of the split auxiliary belt layers 36 as shown in FIG. 2. Thus, the reinforcing elements 33 in the outer belt reinforcing layer 32b are crossed with the reinforcing elements 38 in the split auxiliary belt layer 36, so that both widthwise outer end portions of the widest-width outer belt reinforcing layer 32b are reinforced with the split auxiliary belt layers 36 to increase the shearing rigidity in the circumferential direction at the tread end portion.

During the rotation of the tire 11 having the above structure, even when a force directing forward in a traveling direction is applied to the vicinity of the equatorial plane S of the tire and a force directing backward in the traveling direction is applied to the vicinity of the tread end E as previously mentioned, the shearing deformation at the tread end portion is effectively controlled by the presence of the split auxiliary belt layer 36, whereby the slippage between the tread end portion and the road surface is reduced to decrease the wearing rate at the tread end portion.

Instead of arranging the split auxiliary belt layer 36 as mentioned above, it is considered that the width of the inner belt layer 25a or the outer belt layer 25b is made wider to overlap the widthwise outer end portion thereof with the widthwise outer end portion of the widest-width outer belt reinforcing layer 32b. In this case, however, strain through a load is concentrated in the widthwise outer end of the widened inner or outer belt layer 25a or 25b to cause belt separation between such a belt layer and the outer belt reinforcing layer. On the contrary, according to the invention, a member overlapping with both widthwise outer end portions of the outer belt reinforcing layer 32b is constructed with the pair of widthwise divided split auxiliary belt layers 36 having a relatively narrow width, so that the concentration of strain through the load at the widthwise outer end is mitigated, whereby the occurrence of separation failure can be prevented.

The inclination angle of the reinforcing elements 38 embedded in the split auxiliary belt layer 36 with respect to the equatorial plane S of the tire is preferable to be within a range of 10°–60°. Because, when the inclination angle is within a range of 10°–60°, the shearing deformation at the tread end portion can be strongly controlled while facilitating the shaping of the split auxiliary belt layer 36. The reinforcing element 38 is made of an inextensible material such as steel or aramid fiber likewise the reinforcing element 26 used in the belt layer 25.

In the illustrated embodiment, the split auxiliary belt layer 36 is arranged between the carcass 18 and the widest-width outer belt reinforcing layer 32b so as to overlap with both widthwise outer end portions of the outer belt reinforcing layer 32b. In this case, the deformation of the carcass 18 itself causing the shearing deformation can be effectively controlled, whereby the shearing deformation at the tread end portion can be controlled more strongly.

Figure 3:
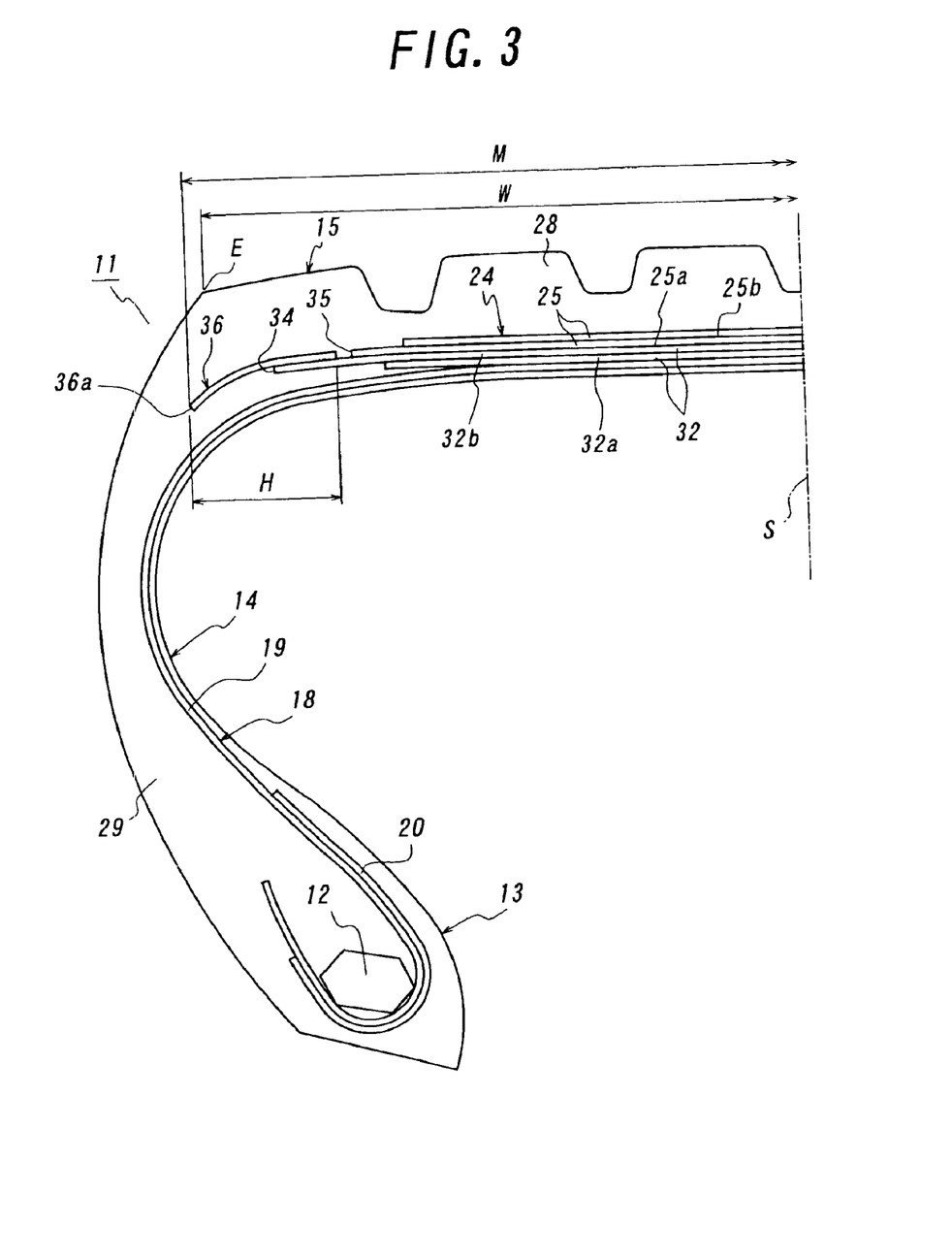
FIG. 3 is a diagrammatically radial section view of another embodiment of the tire according to the invention.

Moreover, the pair of the split auxiliary belt layers 36 may be arranged between the outer belt reinforcing layer 32b and the tread rubber 28 as shown in FIG. 3. In this case, the propagation of the shearing deformation at the tread end portion can be shut off on the way by the split auxiliary belt layer 36, whereby the total amount of the shearing deformation can be decreased.

And also, when the axial distance from the equatorial plane S of the tire to the tread end E is W, the width H of the split auxiliary belt layer 36 is preferable to be within a range of 0.10W–0.60W. When the width H is less than 0.10W, the width of the split auxiliary belt layer 36 is too narrow and the reinforcement to both widthwise outer end portions of the outer belt reinforcing layer 32b is insufficient, while when it exceeds 0.60W, strain at the widthwise outer end 36a of the split auxiliary belt layer 36 becomes large and there is a fear of causing the separation failure.

Further, the axial distance M from the equatorial plane S of the tire to the widthwise outer end 36a of the split auxiliary belt layer 36 is preferable to be within a range of 0.90W–1.20W. When the distance M is less than 0.90W, the overlapping amount of the split auxiliary belt layer 36 with both widthwise outer end portions of the outer belt reinforcing layer 32b becomes less and the reinforcement to both widthwise outer end portions is insufficient, while when it exceeds 1.20W, strain at the widthwise outer end 36a of the split auxiliary belt layer 36 becomes large and there is a fear of causing the separation failure.

Moreover, the overlapping amount of the split auxiliary belt layer 36 with a portion of the outer belt reinforcing layer 32b located outward from the widthwise outer end 35 of the inner belt layer 25a in the widthwise direction is preferable to be not less than 50% of the width of this portion for surely enhancing the rigidity in the circumferential direction of both widthwise outer end portions of the outer belt reinforcing layer 32b, and also the overlapping position is preferable to more approach to the widthwise outer end.

Figure 4:
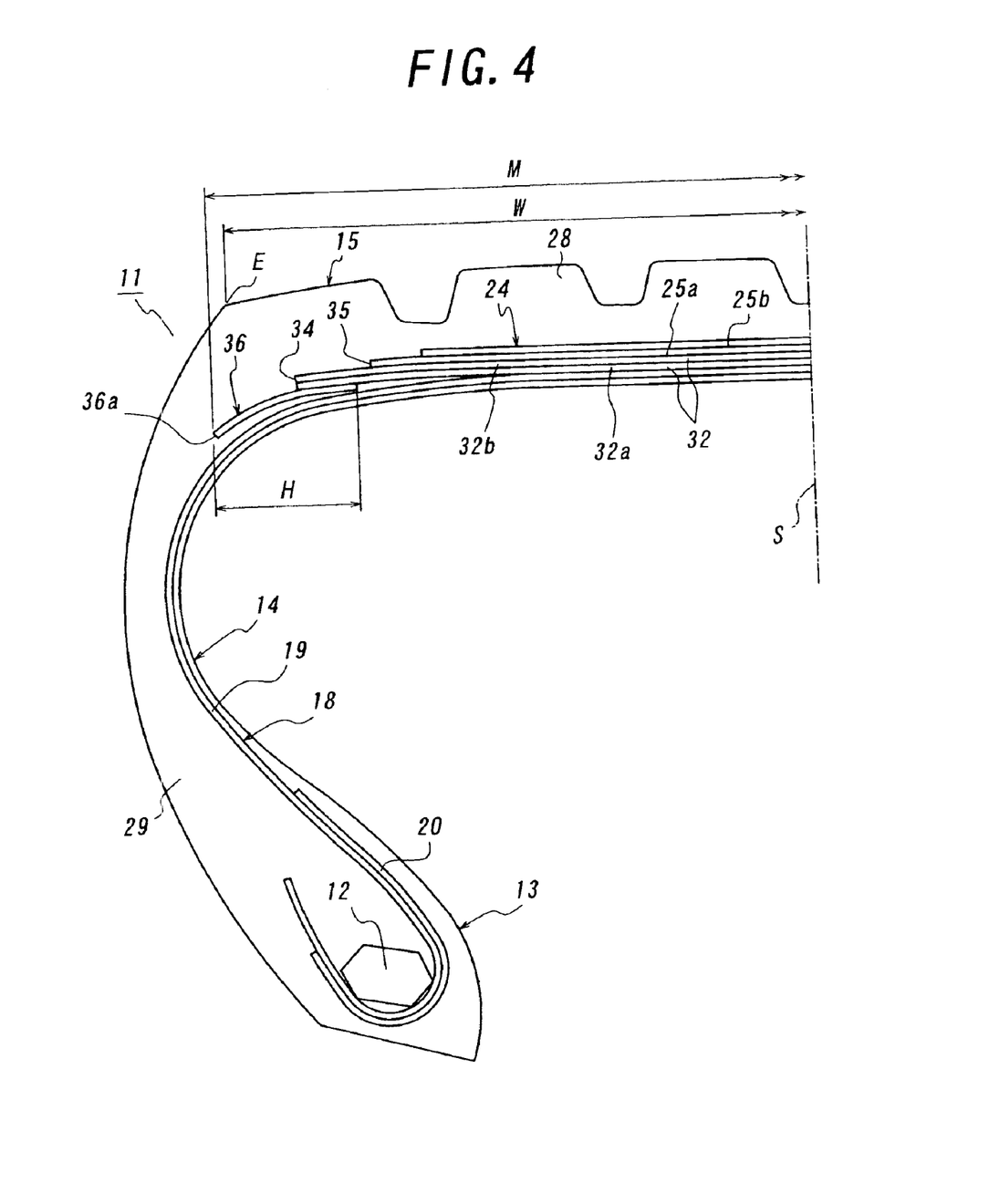
FIGS. 4 and 5 are diagrammatically radial section views of modified embodiments of the tire shown in FIG. 1, respectively.
Figure 5:
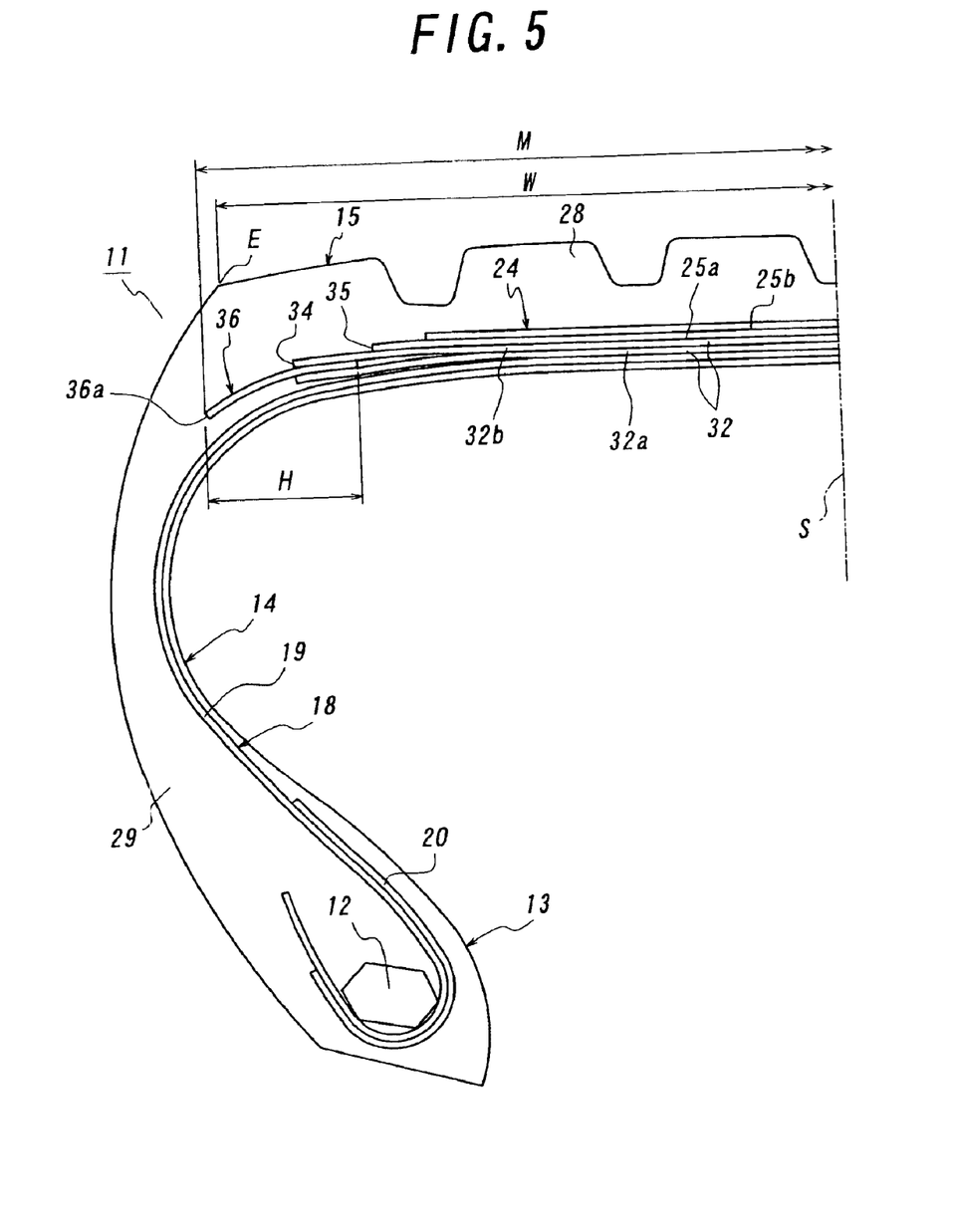
Figure 6:
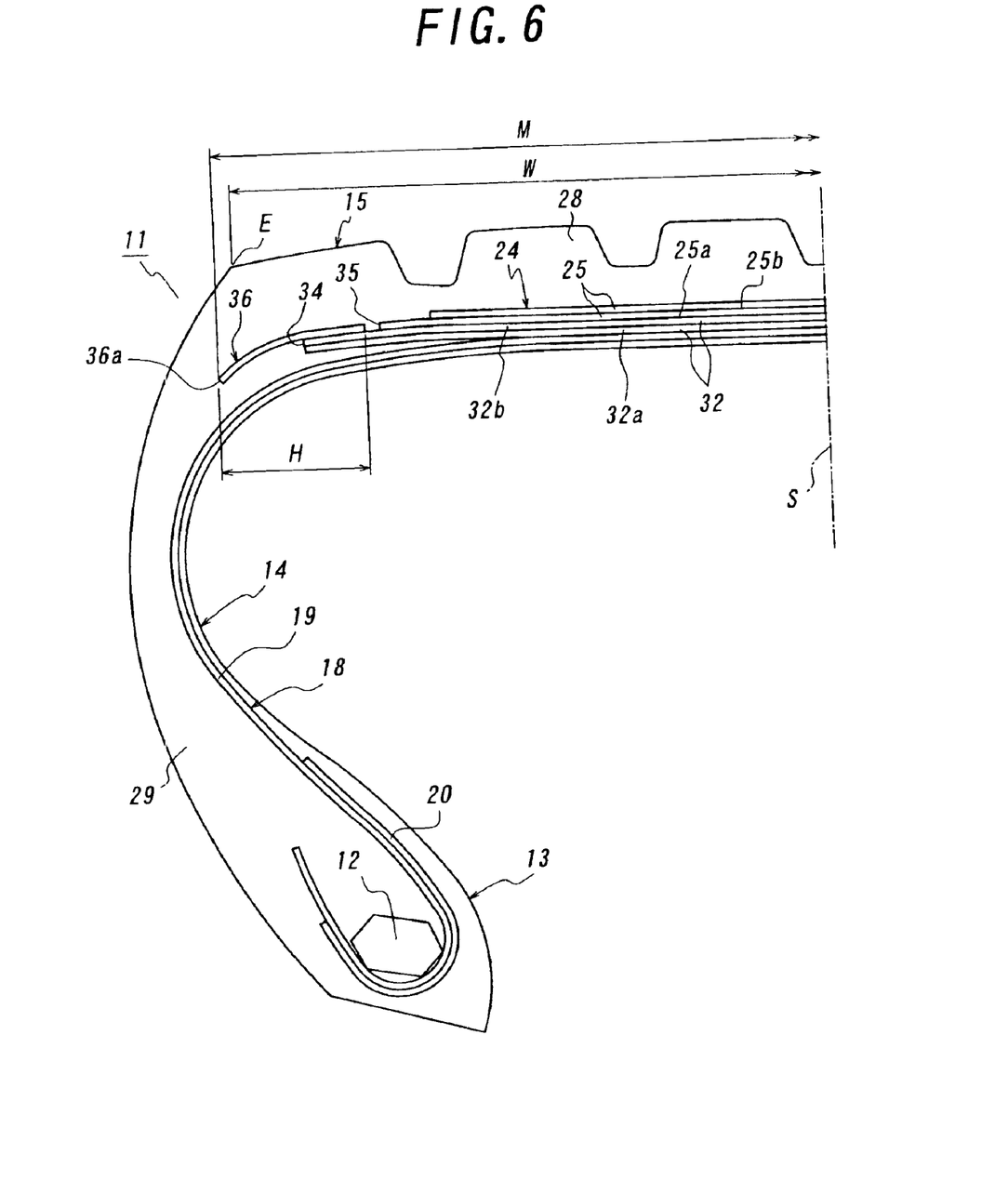
FIG. 6 is a diagrammatically radial section view of a modified embodiment of the tire shown in FIG. 3.

Although the widest-width outer belt reinforcing layer 32b is one ply in the illustrated embodiment, when the reinforcing elements embedded in the interior of such a layer extend substantially in the circumferential direction and hardly withstand to the shearing force in the circumferential direction, two or more plies having equal widths may be the widest-width belt reinforcing layer together. In FIGS. 4–6 are shown examples using the widest-width belt reinforcing layer 32 comprised of two equal-width plies, respectively. In FIG. 4, the split auxiliary belt layer 36 is arranged at the inside of the belt reinforcing layer 32a located inward in the radial direction. In FIG. 5, the split auxiliary belt layer 36 is interposed between the two belt reinforcing layers 32a, 32b. In FIG. 6, the split auxiliary belt layer 36 is arranged at the outside of the belt reinforcing layer 32b located outward in the radial direction. These tires shown in FIGS. 4–6 are modified embodiments of FIGS. 1 and 3 and develop substantially the same effects.

Although the belt reinforcing layer 32 is arranged at the inside of the belt 24 in the radial direction in the illustrated embodiment, the belt reinforcing layer may be arranged between the belt layers 25 constituting the belt 24, or the belt reinforcing layer may be arranged at the outside of the belt layers in the radial direction. In the latter case, there is a fear of cutting the reinforcing elements extending substantially in the circumferential direction in the belt reinforcing layer by projection input, so that it is preferable to further arrange a protection layer on the outside of the belt reinforcing layer in the radial direction.

Figure 7:
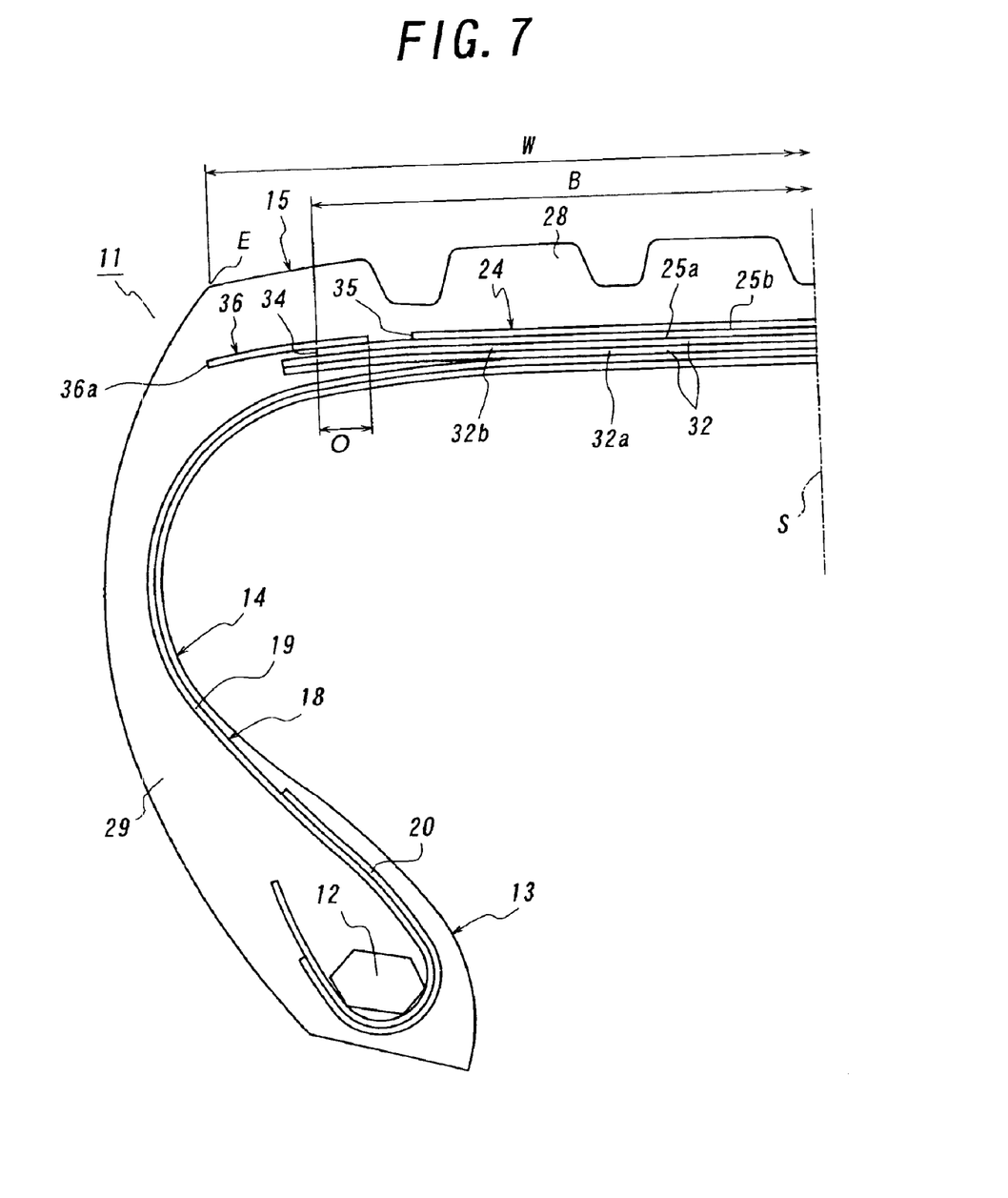
FIG. 7 is a diagrammatically radial section view of the other embodiment of the tire according to the invention.
Figure 8:
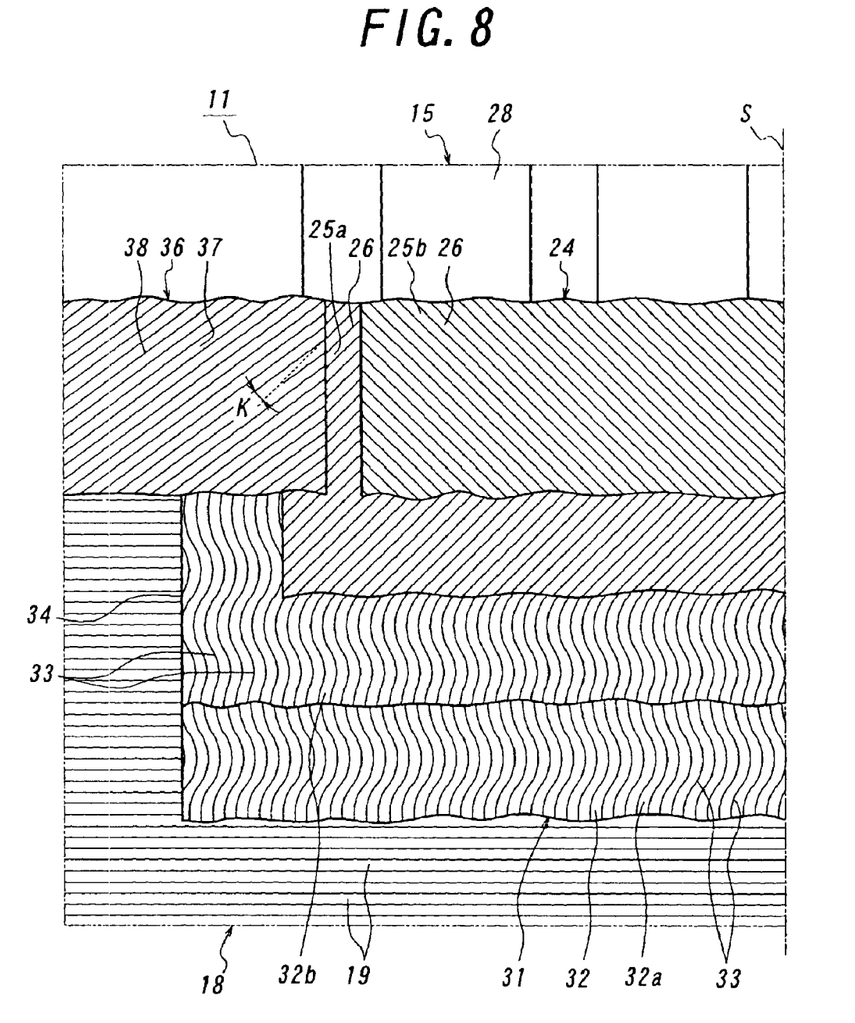
FIG. 8 is a partly broken plan view of a tread portion in the tire shown in FIG. 7.

In FIGS. 7 and 8 is shown a modified embodiment of the tire shown in FIG. 1, wherein the belt reinforcing layer 32 is comprised of two widest-width belt reinforcing layers 32a, 32b, and the widthwise inner end portion of each of the split auxiliary belt layers 36 is arranged over the belt reinforcing layer 32 so as to overlap with the widthwise outer end portion of the wider-width belt layer 25a in the belt 24 laminated on the outside of the belt reinforcing layer 32 in the radial direction, and the reinforcing elements in the split auxiliary belt layer 36 are inclined in the same direction as the reinforcing elements inclined in the wider-width belt layer 25a.

In the tire shown in FIG. 7, therefore, a part of the split auxiliary belt layer 36 is always existent outward from the widthwise outer ends of the wider-width belt layer 25a and the widest-width belt reinforcing layer 32 in the widthwise direction, and the inclined reinforcing elements withstanding to shearing in the circumferential direction to a certain level are embedded in the split auxiliary belt layer 36, so that the shearing rigidity in the circumferential direction of the split auxiliary belt layer 36 becomes large as compared with that in the widthwise outer end portion of the belt reinforcing layer 32. As a result, the shearing deformation of the tread rubber 28 in the vicinity of the tread end E based on the difference in peripheral length is controlled to decrease the force directing toward the braking side, whereby the irregular wear can be effectively controlled.

Further, the reinforcing elements embedded in the split auxiliary belt layer 36 are made of the inextensible material such as steel, aramid fiber or the like likewise the reinforcing elements 26 in the belt layers 25a, 25b and arranged in parallel to the reinforcing elements 26 or in the same direction within a range of a crossing angle K of −10° to +10°, so that the concentration of interlaminar strain can be mitigated. Here, "+" means a direction of increasing the inclination angle with respect to the equatorial plane S of the tire. When the inclination angle is outside the above range, there is caused a fear that the interlaminar strain concentrates in the overlapped portion between the split auxiliary belt layer and the belt layer.

Also, it is preferable that the width O of the overlapped portion between the split auxiliary belt layer 36 and the wider-width belt layer 25a is within a range of 0.03–0.10 times the tread width 2W (W is an axial distance from the equatorial plane of the tire to the tread end). When the ratio O/2W is less than 0.03, the restraint of the split auxiliary belt layer 36 by the belt layer 25a becomes insufficient, and the shearing deformation of the tread rubber 28 in the vicinity of the tread end E can not be effectively controlled, while when it exceeds 0.10, it is feared that strain is concentrated between the split auxiliary belt layer 36 and the wider-width belt layer 25a to cause separation failure.

Moreover, it is preferable that the width B of the wider-width belt layer 25a is within a range of 0.40–0.85 times the tread width 2W. When the ratio B/2W is less than 0.40, the width of the split auxiliary belt layer 36 is too wide and strain is concentrated in the widthwise outer end 36a thereof, while when it exceeds 0.85, it is feared that strain concentrates in to widthwise outer end 34 of the wider-width belt layer 25a to cause separation failure.

Figure 9:
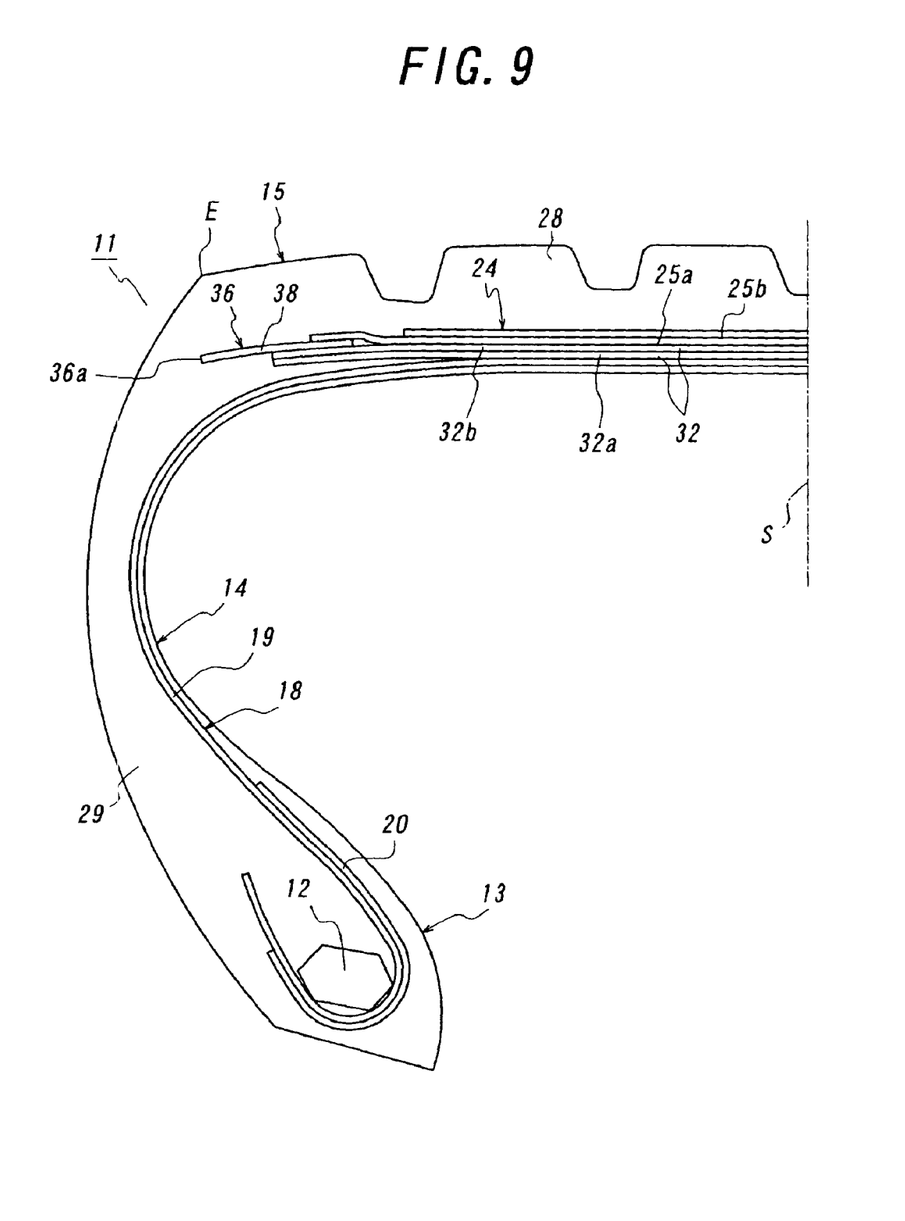
FIG. 9 is a diagrammatically radial section view of a further embodiment of the tire according to the invention.

FIG. 9 is a modified example of FIG. 7, wherein the widthwise inner end portion of the split auxiliary belt layer 36 is interposed between the widthwise outer end portion of the wider-width belt layer 25a and the belt reinforcing layer 32b inward in the radial direction while closing to the above widthwise outer end portion. In this case, there can be obtained substantially the same effects as in the embodiment of FIG. 7.

EXAMPLE

In order to confirm the effects of the invention, there are provided 31 test tires having a tire size of 435/45R22.5 and an axial distance W from an equatorial plane S to a tread end E of 185 mm. Among these tires, a tire of a conventional example has a belt structure shown in FIG. 4 except that a split auxiliary belt layer is not arranged, and a tire of a comparative example has the same belt structure as in the conventional example except that one of the belt layers has a widest width. On the other hand, tires of Examples 1–29 have belt structures as shown in FIGS. 1–9 provided with belt layers, belt reinforcing layers and split auxiliary belt layer having dimensions as shown in Table 1.

Then, each of the test tires is assembled onto a rim of 14.00×22.5, inflated under an inner pressure of 900 kPa, and mounted onto a driving wheel of a large-size bus of 2-D wheel system. Thereafter, the tire is run on an expressway at a speed of 80 km/h under a load of 49.0 kN over 10,000 km. After the completion of the running, worn amount on the equatorial plane S of the tire and worn amount on the tread end portion are measured to determine a difference C (mm) therebetween. Also, the tread rubber is peeled off from the tire to measure a crack length N (mm) at the widthwise outer end of the split auxiliary belt layer. These results are shown in Table 1. In this case, the crack length N in the tire of the conventional example is a value at the widthwise outer end of the inner belt layer.

TABLE 1-1

Tire size: 435/45R22.5
Tread half-width (equatorial plane of tire to tread end) W: 185

|  | Conventional Example | Comparative Example | Example 1 | Example 2 | Example 3 | Example 4 |
|---|---|---|---|---|---|---|
| Belt structure (32a - 32b - 25a - 25b) | circumferential - circumferential - slant - slant | ← | FIG. 1 | ← | ← | FIG. 3 |
| Half width of belt reinforcing layer 32a (mm) | 165 | ← | 115 | ← | ← | ← |
| Half width of belt reinforcing layer 32b (mm) | 165 | ← | 165 | ← | ← | ← |
| Half width of belt layer 25a (mm) | 135 | 185 | 135 | ← | ← | ← |
| Half width of belt layer 25b (mm) | 115 | ← | 115 | ← | ← | ← |
| Widest-width layer | 32a, 32b | 25a | 32b | ← | ← | ← |
| Inclination angle of reinforcing element in split auxiliary belt layer 36 | — | — | 45 L | ← | ← | ← |
| Width H of split auxiliary belt layer 36 | — | — | 0.3W(55) | 0.6W(110) | 0.65W(120) | 0.3W(55) |
| Radial position of split auxiliary belt layer 36 | — | — | inside 32b | ← | ← | outside 32b |
| Overlapping amount of layer 36 with layer 32a or b or layer 25a (mm) | — | — | 25 | 80 | 90 | 25 |
| Position M of widthwise outer end of split auxiliary belt layer 36 | — | — | 1.05W(195) | ← | ← | ← |
| Difference of inclination angle in reinforcing element between layer 36 and layer 25a | — | — | — | — | — | — |
| Resistance to irregular wear (difference C) | 1.2 | 0.69 | 0.56 | 0.55 | 0.5 | 0.51 |
| Resistance to separation failure (crack length N) | 2.1 | 3.7 | 2.3 | 2.4 | 3 | 2 |

TABLE 1-2

Tire size: 435/45R22.5
Tread half-width (equatorial plane of tire to tread end) W: 185

|  | Example 5 | Example 6 | Example 7 | Example 8 | Example 9 | Example 10 |
|---|---|---|---|---|---|---|
| Belt structure (32a - 32b - 25a - 25b) | ← | ← | ← | ← | ← | FIG. 4 |
| Half width of belt reinforcing layer 32a (mm) | ← | ← | ← | ← | ← | 165 |
| Half width of belt reinforcing layer 32b (mm) | ← | ← | ← | 190 | 186 | 165 |
| Half width of belt layer 25a (mm) | ← | ← | ← | ← | ← | 135 |
| Half width of belt layer 25b (mm) | ← | ← | ← | ← | ← | 115 |
| Widest-width layer | ← | ← | ← | ← | ← | 32a, 32b |
| Inclination angle of reinforcing element in split auxiliary belt layer 36 | ← | ← | ← | ← | ← | 45 L |
| Width H of split auxiliary belt layer 36 | ← | 0.41W(80) | 0.46W(90) | 0.08W(15) | 0.1W(19) | 0.3W(35) |
| Radial position of split auxiliary belt layer 36 | ← | ← | ← | ← | ← | inside 32b |
| Overlapping amount of layer 36 with layer 32a or b or layer 25a (mm) | 55 (match ends to each other) | 25 | ← | 10 | ← | 25 |
| Position M of widthwise outer end of split auxiliary belt layer 36 | 0.9L(165) | 1.2W(220) | 1.25W(230) | 1.05W(195) | ← | 1.05W(195) |
| Difference of inclination angle in reinforcing element between layer 36 and layer 25a | — | — | — | — | — | — |
| Resistance to irregular wear (difference C) | 0.72 | 0.57 | 0.5 | 0.95 | 0.7 | 0.59 |
| Resistance to separation failure (crack length N) | 2.1 | 2.3 | 3 | 2 | 2.4 | 2.3 |

TABLE 1-3

Tire size: 435/45R22.5
Tread half-width (equatorial plane of tire to tread end) W: 185

|  | Example 11 | Example 12 | Example 13 | Example 14 | Example 15 | Example 16 |
|---|---|---|---|---|---|---|
| Belt structure (32a - 32b - 25a- 25b) | FIG. 5 | FIG. 6 | FIG. 4 | ← | FIG. 6 | ← |
| Half width of belt reinforcing layer 32a (mm) | ← | ← | ← | ← | ← | ← |
| Half width of belt reinforcing layer 32b (mm) | ← | ← | ← | ← | ← | ← |
| Half width of belt layer 25a (mm) | ← | ← | ← | ← | ← | ← |

TABLE 1-3-continued

Tire size: 435/45R22.5
Tread half-width (equatorial plane of tire to tread end) W: 185

|  | Example 11 | Example 12 | Example 13 | Example 14 | Example 15 | Example 16 |
|---|---|---|---|---|---|---|
| Half width of belt layer 25b (mm) | ← | ← | ← | ← | ← | ← |
| Widest-width layer | ← | ← | ← | ← | ← | ← |
| Inclination angle of reinforcing element in split auxiliary belt layer 36 | ← | ← | 45 R | 75 L | 45 R | 75 L |
| Width H of split auxiliary belt layer 36 | ← | ← | ← | ← | ← | ← |
| Radial position of split auxiliary belt layer 36 | between 32a and 32b | outside 32b | inside 32a | ← | outside 32b | ← |
| Overlapping amount of layer 36 with layer 32a or b or layer 25a (mm) | ← | ← | ← | ← | ← | ← |
| Position M of widthwise outer end of split auxiliary belt layer 36 | ← | ← | ← | ← | ← | ← |
| Difference of inclination angle in reinforcing element between layer 36 and layer 25a | — | — | — | — | — | — |
| Resistance to irregular wear (difference C) | 0.6 | 0.55 | 0.52 | 0.95 | 0.56 | 0.93 |
| Resistance to separation failure (crack length N) | 2.2 | 2 | 2.1 | 1.7 | 2.4 | 2.2 |

TABLE 1-4

Tire size: 435/45R22.5
Tread half-width (equatorial plane of tire to tread end) W: 185

|  | Example 17 | Example 18 | Example 19 | Example 20 | Example 21 | Example 22 | Example 23 |
|---|---|---|---|---|---|---|---|
| Belt structure (32a - 32b - 25a - 25b) | FIG. 7 | ← | ← | ← | ← | ← | ← |
| Half width of belt reinforcing layer 32a (mm) | 165 | ← | ← | ← | ← | ← | 165 |
| Half width of belt reinforcing layer 32b (mm) | 165 | ← | ← | ← | ← | ← | 165 |
| Half width of belt layer 25a (mm) | 135 | ← | ← | ← | ← | ← | 135 |
| Half width of belt layer 25b (mm) | 115 | ← | ← | ← | ← | ← | 115 |
| Widest-width layer | 32a, 32b | ← | ← | ← | ← | ← | 32a, 32b |
| Inclination angle of reinforcing element in split auxiliary belt layer 36 | 45 L | 52 L | 40 L | 42 L | 62 L | 64 L | 52 L |
| Width H of split auxiliary belt layer 36 | 0.43W(80) | ← | ← | ← | ← | ← | 0.35WL(65) |
| Radial position of split auxiliary belt layer 36 | outside 25a | ← | ← | ← | ← | ← | outside 25a |
| Overlapping amount of layer 36 with layer 32a or b or layer 25a (mm) | 50(25a = 20) | ← | ← | ← | ← | ← | 35(25a = 5) |
| Position M of widthwise outer end of split auxiliary belt layer 36 | 1.05W(195) | ← | ← | ← | ← | ← | 1.05W(195) |
| Difference of inclination angle in reinforcing element between layer 36 and layer 25a | 7(25a) | 0(25a) | 12 | 10 | −10 | −12 | 0 |
| Resistance to irregular wear (difference C) | 0.47 | 0.45 | 0.47 | 0.47 | 0.48 | 0.47 | 0.58 |
| Resistance to separation failure (crack length N) | 2.4 | 2.2 | 2.7 | 2.5 | 2.4 | 2.7 | 2.2 |

TABLE 1-5

Tire size: 435/45R22.5
Tread half-width (equatorial plane of tire to tread end) W: 185

|  | Example 24 | Example 25 | Example 26 | Example 27 | Example 28 | Example 29 |
|---|---|---|---|---|---|---|
| Belt structure (32a - 32b - 25a - 25b) | ← | ← | ← | ← | ← | FIG. 9 |
| Half width of belt reinforcing layer 32a (mm) | ← | ← | ← | ← | ← | ← |
| Half width of belt reinforcing layer 32b (mm) | ← | ← | ← | ← | ← | ← |
| Half width of belt layer 25a (mm) | ← | ← | 155 | 160 | 175 | 135 |
| Half width of belt layer 25b (mm) | ← | ← | ← | ← | ← | ← |
| Widest-width layer | ← | ← | ← | ← | ← | 32a, 32b |
| Inclination angle of reinforcing element in split auxiliary belt layer 36 | ← | ← | ← | ← | ← | ← |
| Width H of split auxiliary belt layer 36 | 0.38W(70) | 0.46W(85) | 0.32W(60) | 0.30W(55) | 0.22W(40) | 0.43W(80) |
| Radial position of split auxiliary belt layer 36 | ← | ← | ← | ← | ← | between 32b and 25a |
| Overlapping amount of layer 36 with layer 32a or b or layer 25a (mm) | 40(25a = 10) | 55(25a = 25) | 30(25a = 20) | 25(25a = 20) | 10(25a = 20) | 35(25a = 5) |
| Position M of widthwise outer end of split auxiliary belt layer 36 | ← | ← | ← | ← | ← | ← |
| Difference of inclination angle in reinforcing element between layer 36 and layer 25a | 0 | 0 | 0 | 0 | 0 | 0 |

TABLE 1-5-continued

Tire size: 435/45R22.5
Tread half-width (equatorial plane of tire to tread end) W: 185

|  | Example 24 | Example 25 | Example 26 | Example 27 | Example 28 | Example 29 |
|---|---|---|---|---|---|---|
| Resistance to irregular wear (difference C) | 0.51 | 0.48 | 0.48 | 0.47 | 0.47 | 0.45 |
| Resistance to separation failure (crack length N) | 2.3 | 2.3 | 2.3 | 2.3 | 2.5 | 2.5 |

As seen from Table 1, when the width H of the split auxiliary belt layer is within a range of 0.10W–0.60W, the resistance to irregular wear can be improved without substantially deteriorating the resistance to separation failure. It is understood that when the width H is less than 0.10W, the improvement of the resistance to irregular wear is insufficient, while when the width H exceeds 0.60W, the resistance to separation failure is somewhat deteriorated.

Also, it is understood that when the distance M is within a range of 0.90W–1.20W, the resistance to irregular wear can be improved without substantially deteriorating the resistance to separation failure, but when the distance M is less than 0.90W, the improvement of the resistance to irregular wear is insufficient, while when the distance M exceeds 1.20W, the resistance to separation failure is somewhat deteriorated.

Further, as seen from Table 1, in the tires of Examples 17–29, the resistance to irregular wear is improved while substantially maintaining the resistance to separation failure as compared with the tire of the conventional example. Particularly, as seen from the results on the tires of Examples 17–22, when the crossing angle K is within a range of –10° to +10°, the occurrence of crack can be effectively controlled, but when it is outside the above range, the effect of controlling the occurrence of crack is insufficient. Furthermore, as seen from the results on the tires of Examples 17–29, when the overlapping amount between the split auxiliary belt layer and the belt layer is within a given range, the resistance to irregular wear can be effectively improved while effectively controlling the occurrence of crack, but when it is outside the above range, the effects of controlling the occurrence of crack and improving the resistance to irregular wear are insufficient, and also when the ratio of the width of the belt layer to the tread width is within a given range, the occurrence of crack can be effectively controlled, but when it is outside the above range, the effect of controlling the occurrence of crack is insufficient.

INDUSTRIAL APPLICABILITY

As mentioned above, according to the invention, the wearing rate at the tread end portion can be decreased to effectively control the irregular wear, so that the invention is advantageously applicable to various pneumatic tires, particularly heavy duty pneumatic radial tires for truck, bus and the like.

What is claimed is:

1. A pneumatic tire comprising a carcass toroidally extending between a pair of bead portions, a belt arranged at the outside of the carcass in a radial direction and comprised of at least two belt layers, plural reinforcing elements embedded in said layers being crossed with each other with respect to an equatorial plane of the tire, at least one belt reinforcing layer arranged so as to overlap with the belt and extend over a widthwise outer end thereof and embedding plural reinforcing elements therein each extending substantially in a circumferential direction while bending in a wavy or zigzag form, and a tread rubber arranged at the outside of the belt in the radial direction, further comprising a pair of split auxiliary belt layers arranged so as to overlap at least with both widthwise outer end portions of a widest-width belt reinforcing layer and comprised of at least one ply containing plural reinforcing elements embedded therein at an inclination angle with respect to the equatorial plane different from that of the reinforcing element in the widest-width belt reinforcing layer, wherein when the split auxiliary belt layers overlap with only the widest-width belt reinforcing layer and an axial distance from the equatorial plane of the tire to the tread end is W, a width H of the split auxiliary belt layer is within a range of 0.10W–0.60W and a distance M from the equatorial plane of the tire to a widthwise outer end of the split auxiliary belt layer is within a range of 0.90W–1.20W.

2. A pneumatic tire according to claim 1, wherein the split auxiliary belt layers are arranged between the carcass and the widest-width belt reinforcing layer.

3. A pneumatic tire according to claim 1, wherein an inclination angle of the reinforcing element elements embedded in-the-split auxiliary-belt layers with respect to the equatorial plane of the tire is within a range of 10°–80°.

4. A pneumatic tire according to claim 1, wherein a widthwise inner end portion of the split auxiliary belt layer is arranged over the widest-width belt reinforcing layer so as to overlap with the widthwise outer end portion of a wider-width belt layer among the belt layers constituting the belt in the radial direction, and the reinforcing elements in the split auxiliary belt layer are inclined in the same direction as the reinforcing elements inclined in the wider-width belt layer.

5. A pneumatic tire according to claim 4, wherein the reinforcing elements in the split auxiliary belt layer are parallel to the reinforcing elements in the wider-width belt layer or are inclined in the same direction within a range of +10° to –10°.

6. A pneumatic tire according to claim 4, wherein a width O of an overlapped portion between the split auxiliary belt layer and the wider-width belt layer is within a range of 0.03–0.10 times a tread width 2W (W is an axial distance from the equatorial plane of the tire to the tread end).

7. A pneumatic tire according to claim 4, wherein a width B of the wider-width belt layer is within a range of 0.40–0.85 times the tread width 2W.

8. A pneumatic tire according to claim 1, wherein the split auxiliary belt layer is arranged between the tread rubber and the widest-width belt reinforcing layer.

* * * * *